US008584047B2

(12) United States Patent
Athans et al.

(10) Patent No.: US 8,584,047 B2
(45) Date of Patent: Nov. 12, 2013

(54) ORBITAL REPRESENTATION OF HIERARCHICAL NAVIGATION

(75) Inventors: Emmanuel J. Athans, Lake Forest Park, WA (US); Daniel Dole, Seattle, WA (US); Jeffrey Thomas Chrisope, Kirkland, WA (US); Tarek Madkour, Sammamish, WA (US); Stephen Giff, Bellevue, WA (US); Jeannette Anne Gatlin, Seattle, WA (US); Scott E. Seiber, Medina, WA (US); Jeffrey Stylos, Bellevue, WA (US); James Kristian Johansen, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 375 days.

(21) Appl. No.: 12/782,403

(22) Filed: May 18, 2010

(65) Prior Publication Data
US 2011/0289459 A1   Nov. 24, 2011

(51) Int. Cl.
  *G06F 3/00*  (2006.01)
(52) U.S. Cl.
  USPC ........... 715/854; 715/713; 715/851; 715/853; 715/861; 707/778; 707/829
(58) Field of Classification Search
  USPC .................... 715/713, 851, 861; 707/778, 829
  See application file for complete search history.

(56) References Cited

U.S. PATENT DOCUMENTS

| 5,926,180 | A  | * | 7/1999 | Shimamura ........... 715/739 |
| 6,219,053 | B1 | * | 4/2001 | Tachibana et al. ........... 715/835 |
| 6,237,006 | B1 | * | 5/2001 | Weinberg et al. ............ 707/797 |
| 6,377,287 | B1 | * | 4/2002 | Hao et al. ................. 715/853 |
| 6,538,669 | B1 |   | 3/2003 | Lagueux et al. |
| 6,544,123 | B1 | * | 4/2003 | Tanaka et al. ............ 463/36 |
| 6,897,885 | B1 | * | 5/2005 | Hao et al. ................. 715/853 |
| 7,620,913 | B2 | * | 11/2009 | Hida et al. .............. 715/853 |
| 7,949,964 | B2 | * | 5/2011 | Vimme ................... 715/853 |
| 7,984,389 | B2 | * | 7/2011 | Rusu et al. .............. 715/855 |
| 8,332,782 | B1 | * | 12/2012 | Chang et al. ............. 715/853 |
| 2002/0130907 | A1 | * | 9/2002 | Chi et al. ............... 345/853 |
| 2003/0197740 | A1 | * | 10/2003 | Reponen ............... 345/810 |
| 2005/0010583 | A1 | * | 1/2005 | Clifton-Bligh ........... 707/100 |
| 2005/0166152 | A1 | * | 7/2005 | Hida et al. ............ 715/734 |
| 2006/0259702 | A1 |   | 11/2006 | Sohm et al. |

(Continued)

OTHER PUBLICATIONS

Yee et al., "Animated Exploration of Dynamic Graphs with Radial Layout," Oct. 2001, INFOVIS, Proceedings of the IEEE Symposium on Information Visualization, pp. 1-8.*

(Continued)

*Primary Examiner* — Linh K Pham
(74) *Attorney, Agent, or Firm* — Ogilvie Law Firm

(57) ABSTRACT

Hierarchical structures are visualized and navigated using an orbital model. Sibling nodes are orbitally displayed in a generally circular arrangement along an orbital path. Choosing one of the orbitally displayed nodes opens it, moving down in the hierarchy. Nodes which were not chosen are undisplayed, and child node(s) of the chosen node are orbitally displayed. Node movements may be animated. A history displays recently chosen nodes. Choosing a parent node of the orbiting nodes undisplays the child nodes, and the parent node and its siblings are orbitally displayed, thereby moving up in the hierarchy. A user may select nodes from different parts of the hierarchy by moving them into a selection tray. Selected nodes can then be subjected to a specified batch operation. Controls are available for sorting nodes and/or for altering node appearance in the display.

20 Claims, 7 Drawing Sheets

(56) References Cited

U.S. PATENT DOCUMENTS

| | | | |
|---|---|---|---|
| 2007/0106684 A1 | 5/2007 | Gould et al. | |
| 2007/0129112 A1* | 6/2007 | Tarn | 455/566 |
| 2008/0059911 A1* | 3/2008 | Kulo et al. | 715/853 |
| 2008/0077875 A1* | 3/2008 | Li et al. | 715/764 |
| 2008/0141166 A1 | 6/2008 | Goldberg et al. | |
| 2009/0276714 A1 | 11/2009 | Kandlikar et al. | |
| 2010/0235385 A1* | 9/2010 | Asai et al. | 707/769 |
| 2011/0138340 A1* | 6/2011 | Holm-Petersen et al. | 715/854 |
| 2011/0219324 A1* | 9/2011 | Watanabe et al. | 715/771 |

OTHER PUBLICATIONS

Yee et al., Animated Exploration of Dynamic Graphs with Radial Layout; 2001; IEEE; 8 pages.*

IToh et al., Hierarchical Data Visualization Using a Fast Rectangle-Packing Algorithm; 2004; IEEE; vol. 10; 12 pages.*

Lai; Visualization of Blog Network by a Keyword Based Graph with Interactive Filtering; 2009; IEEE; 5 pages.*

Plaisant et al., Space Tree: supporting Exploration in Large Node Link Tree Design Evolution and Empirical Evaluation; IEEE; 2002; 8 pages.*

Ganser et al., Topological Fisheye Views for Visualizing Large Graphs; 2005; IEEE; vol. 11; 12 pages.*

Ducheneaut, et al., "The Orbital Browser Composing Ubicomp Services Using Only Rotation and Selection", Retrieved at << http://www2.parc.com/csl/members/nicolas/documents/CHI2006-Orbital.pdf >>, Conference on Human Factors in Computing Systems, CHI '06 extended abstracts on Human factors in computing systems, Apr. 22-27, 2006, pp. 321-326.

Yee, et al., "Animated Exploration of Dynamic Graphs with Radial Layout", Retrieved at << http://people.seas.harvard.edu/~rachna/papers/infovis2001.pdf >>, INFOVIS, Proceedings of the IEEE Symposium on Information Visualization, (INFOVIS'01), Oct. 22-23, 2001, pp. 8.

Parry, et al., "Hierarchical Storage and Visualization of Real-Time 3D Data", Retrieved at << http://home.cc.gatech.edu/parry/uploads/1/spie01.doc , Visualization of Temporal and Spatial Data for Civilian and Defense Applications III SPIE, Proceedings of SPIE vol. # 4368, Radar Sensor Technology and Data Visualization, Apr. 16, 2001, pp. 11.

Stasko, et al., "Focus+Context Display and Navigation Techniques for Enhancing Radial, Space-Filling Hierarchy Visualizations", Retrieved at << http://citeseerx.ist.psu.edu/viewdoc/download?doi=10.1.1.6.2937&rep=rep1&type=pdf >>, INFOVIS, Proceedings of the IEEE Symposium on Information Vizualization 2000, Oct. 9-10, 2000, pp. 9.

Andrews, et al., "Information Slices: Visualising and Exploring Large Hierarchies using Cascading, Semi-Circular Discs", Retrieved at << http://www.iicm.tugraz.at/liberation/iicm_papers/ivis98.pdf >>, Late Breaking Hot Topic Paper, IEEE InfoVis'98, Oct. 1998, pp. 4.

Nguyen, et al., "Visualising File-Systems Using ENCCON Model", Retrieved at << http://crpit.com/confpapers/CRPITV36Nguyen.pdf >>, ACM International Conference Proceeding Series, vol. 100, Proceedings of the Pan-Sydney area workshop on Visual information processing, 2004, pp. 5.

"Comparison of file managers", Retrieved at << http://en.wikipedia.org/wiki/Comparison_of_file_managers >>, no later than Apr. 5, 2010, pp. 12.

"File manager", Retrieved at << http://en.wikipedia.org/wiki/Navigational_file_manager >>, no later than Apr. 1, 2010, pp. 8.

* cited by examiner

ORBITAL REPRESENTATION OF HIERARCHICAL NAVIGATION

BACKGROUND

Hierarchical structures include nodes organized in parent-child relationships which are indicated by links between nodes. Additional links may also be part of the hierarchical structure. On a particular computer, for example, nodes may correspond to files and file folders, with the folders and/or files within a given folder viewed as children of the folder that contains them. Shortcuts may be viewed as examples of additional links which do not conform to a strict tree hierarchy but nonetheless form part of the hierarchical structure of files and folders. On a computer with multiple drives, each drive may also be considered a node, with each drive being the root of a tree hierarchy containing folders and files stored on the drive. A computer may in turn be a node within a larger hierarchy such as a computer network.

A user interface to a hierarchical structure may provide an indication of a user's current position(s) within the hierarchical structure, and may provide mechanism(s) for exploring the hierarchical structure by changing position and/or by displaying information about node(s) that are near a specified position. Navigation within a hierarchical structure may be accomplished in some cases using a textual interface, such as a command line or script interpreter. A user interface may also provide visual representation(s) of the hierarchical structure and the current position(s), to assist navigation and exploration of the structure.

SUMMARY

Some hierarchical structures include a large number of nodes organized at multiple levels, or a number of similar but distinct nodes, for example. Such characteristics can make it difficult for a user to remember where particular nodes are located and to otherwise make efficient use of a computer directory tree, a network directory, an organizational chart, or another hierarchical structure. Visualizations of the hierarchical structure may be helpful. However, different users may work most easily and effectively with different kinds of hierarchy visualizations and with different approaches to navigation in a hierarchy. Accordingly, innovative approaches to navigation, including different structural and procedural visualizations, may facilitate user navigation within hierarchical structures.

Some embodiments discussed herein provide an orbital visualization model facilitating rapid navigation using a mouse, pen, touch screen, or similar mechanism to help a user traverse directory structures and libraries, or other hierarchical structures. For example, in some embodiments folders, files, and/or other nodes of a hierarchical structure appear in an ellipse. When chosen, a node moves outward to a larger orbit while a newer inner orbit appears displaying the contents of the chosen node. Front and back sections of each orbital ring may be used for micro and macro browsing, respectively.

In some embodiments, multiple sibling nodes are orbitally displayed, e.g., shown in a circular or elliptical arrangement, possibly with their orbital path also displayed. Lines between a parent node and its child node(s) may be omitted from the display. The orbiting nodes may be rotated using a pen, mouse, or finger swipe, for example, allowing a user to browse through the nodes. Suppose a user chooses one of the orbitally displayed sibling nodes. In response, the sibling nodes which were not chosen are undisplayed, and child node(s) of the chosen sibling node are orbitally displayed. The chosen sibling node can be moved into a history which displays recently chosen nodes arranged according to when they were chosen. Node movements may be animated, e.g., by expanding or contracting the orbital arrangement, and by moving nodes along a path smoothly instead of simply showing them at their new location on screen without showing intervening screen positions.

Additional navigation in the hierarchy is also possible. In response to a choice of one of the displayed child nodes, for example, the child nodes which were not chosen are undisplayed and descendant node(s) of the chosen child node are orbitally displayed, thereby moving the user's location down in the hierarchy. Similarly, in response to a choice of a parent node of the displayed child nodes, the child nodes are undisplayed and the parent node and any sibling(s) of the parent node are orbitally displayed, thereby moving up in the hierarchy.

Some embodiments allow a user to gather nodes from different parts of the hierarchy by selecting them. Selected nodes are moved into a selection tray area of the display, although their position in the hierarchy relative to other nodes is unchanged. Selected nodes can then be subjected to any specified operation supported by a given system, e.g., copying, archiving, encrypting, compressing, printing, transmitting, searching, reformatting, and so on. Some embodiments also display controls for sorting nodes and/or for altering node appearance in the display.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
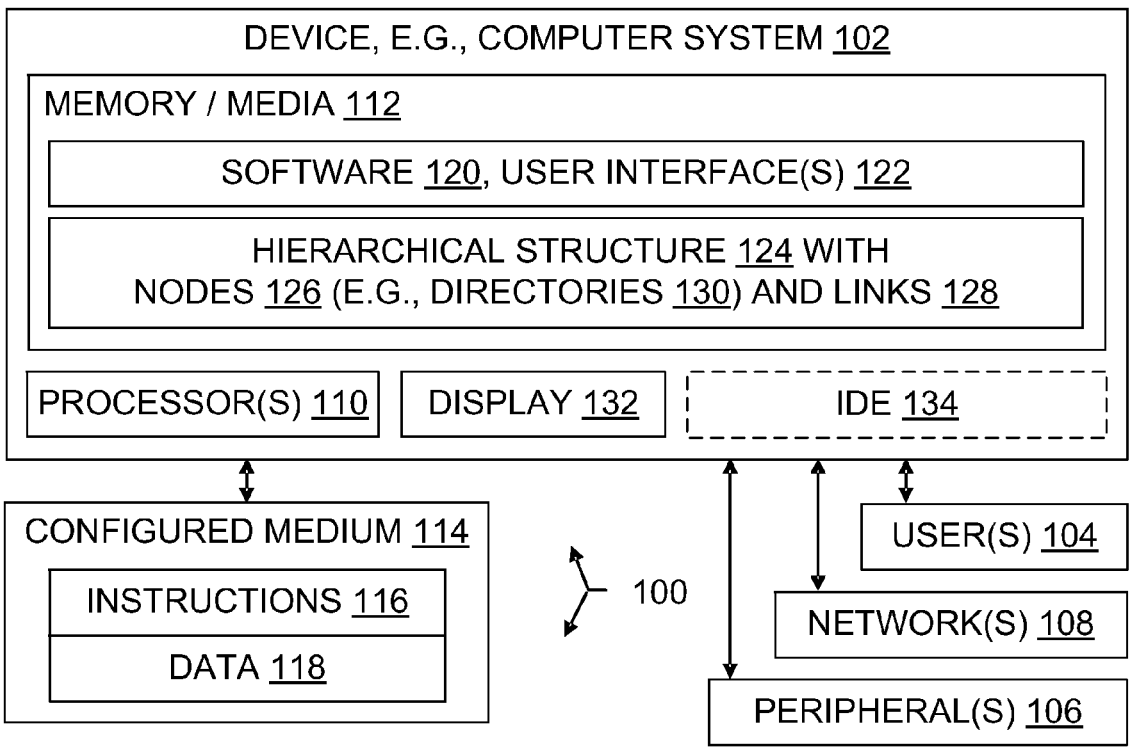
FIG. 1 is a block diagram illustrating a computer system having at least one processor, at least one memory, at least one hierarchical structure containing nodes connected by links, and other items in an operating environment which may be present on multiple network nodes, and also illustrating configured storage medium embodiments.

Hierarchies provide structure in many contexts. One frequently encountered kind of hierarchical structure is the collection of files, file folders, drives, network connections, and other items a computer user explores and interacts with through a file manager. File managers are sometimes called file browsers, file explorers, directory editors, or file finders, for example. A wide variety of file managers exist, and file managers have been categorized in various ways. The categories discussed here are merely examples; other categorizations are also possible. A given file manager may belong to none, one, or multiple categories, depending on the file manager and the categories used.

By way of example categories, command-based file managers have a command line in which a user can enter textual commands. Navigational file managers have a current view and/or other mechanism for showing a user one or more locations within a file system; buttons and/or other mechanisms can be used to change location. Spatial file managers use file drawers, boxes and/or other metaphors, so that users interact with digital files in a way that resembles physical interaction with physical files, e.g., having at most one copy of a folder open at any time. Some file manager interfaces are primarily or solely textual, while others use a graphical interface, e.g., by displaying files as icons and displaying folder-file relationships as lines connecting file system item icons. In particular, 3D file managers use graphics that appear three-dimensional.

Some embodiments described herein provide an orbital visualization model facilitating rapid navigation using a mouse, pen, touch screen, or similar mechanism to help a user traverse directory structures and libraries, or other hierarchical structures. Accordingly, some embodiments may be characterized as navigational file managers. Some embodiments use graphics that appear three-dimensional, and thus could be described as 3D file managers, or as 3D navigational file managers (or as navigational 3D file managers). To the extent that command line interpreters are integrated within an embodiment, an embodiment may also be categorized as a command-based file manager.

The orbital visualization model used in some embodiments may be used, for example, to browse existing directory structures. In some embodiments, items appear in an ellipse, and when an item is selected, the item and its siblings rotate outwards and expand to an orbit of greater distance while a newer inner orbit appears displaying the contents of the selected location; this may be referred to as "inside-out navigation". In other embodiments, an inverted directional model is used, with a subfolder orbit around the parent of the subfolders; this may be referred to as "outside-in navigation". That is, some embodiments expand directories from the inside outward, while others expand from the outside inward. In some embodiments (inside-out and/or outside-in), a user can use front and back sections of each orbital ring for micro/macro browsing.

In some embodiments, an orbital display represents the same file structure that can be viewed through another file manager such as a file explorer. Local drives, attached drives, linked drives, and libraries can be represented in the model's highest directory level. In some embodiments, the orbits move through three distinct locations: a currently viewed orbit (initial view/subfolders), which expands to an upper level (active directory), which expands to a history orbit. The history can be used to navigate backward along the active directory structure path.

In addition to or as an alternative to files and directories as nodes, an orbital display model may be used to represent other hierarchical structures, such as computer networks, organizational charts, genealogies, and so on.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, and similar hardware interface software.

"Code" means processor instructions, data (which includes constants, variables, and data structures), or both instructions and data.

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine.

Figure 14:
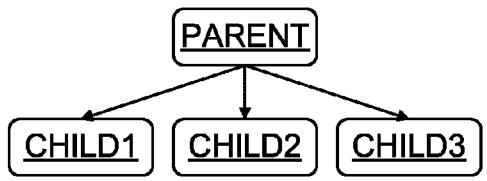
FIG. 14 is a diagram illustrating a hierarchical structure implemented with direct links between a parent and each of its children.
Figure 15:
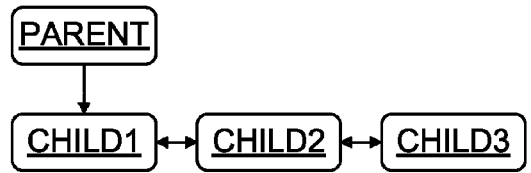
FIG. 15 is a diagram illustrating a hierarchical structure implemented with a direct link between a parent and only one of its several children.

"Hierarchical structure" means a structure in which nodes are organized in a hierarchy, with links representing parent-child relationships in the node. Hierarchical structures are often represented and implemented as trees, with links (e.g., pointers or other memory addressing values) between each child and its parent, such as in the structure shown in FIG. 14. However, a structure can be a hierarchical structure even if some child node has no direct link to its parent node but is linked to the parent instead by way of some sibling node(s), such as in the structure shown in FIG. 15. A structure can also be a hierarchical structure even if it contains links in addition to parent child links, e.g., links between cousin nodes. The nodes in a given hierarchical structure may be all of the same type (e.g., if each node represents a computer in a network and all computers are represented using a single type of node), or the nodes may be of different types (e.g., files, folders, and drives could be represented by three respective node types).

"Orbital curve" as used herein includes, for example, curves which are generally circular (that is, circular, elliptical, or ovoid), or which otherwise appear to be a closed smooth curve, as well as an arcuate portion of an orbital curve. Generally circular orbital curves may be drawn expressly, or they may be implied by movement of nodes along the curve. Many orbital curves are smooth curves which lack sharp corners; mathematically, a curve is smooth if its tangent coming from the left equals its tangent coming from the right at each interior point of the curve. A curve can be drawn with dots or dashes and still be smooth in appearance, by allowing interpolation to imply the undisplayed parts of the curve between the dots or dashes. Also, a curve need not enclose a convex area to be an orbital curve; an outline of an hourglass can be an orbital curve. Also, an orbital curve may intersect itself; an 8-shaped curve is an orbital curve. Some orbital curves are not smooth; a triangle, square, or other polygon may be used as an orbital curve if it is drawn expressly rather than merely implied by node movement.

Throughout this document, use of the optional plural "(s)" means that one or more of the indicated feature is present. For example, "node(s)" means "one or more nodes" or equivalently "at least one node".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as "transmitting to", "sending toward", or "communicating to" a destination may involve intervening action such as forwarding, copying, uploading, downloading, encoding, decoding, compressing, decompressing, encrypting, decrypting and so on by some other party, yet still be understood as being performed directly by the party of interest. Similar considerations apply to "receiving" steps, and steps which occur "in response" to some event; intervening actions may be present.

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked.

Human users 104 may interact with the computer system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable non-transitory storage media 112. Media 112 may be of different physical types. The media 112 may be volatile memory, non-volatile memory, fixed in place media, removable media, magnetic media, optical media, and/or of other types of non-transitory media (as opposed to transitory media such as a wire that merely propagates a signal). In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by as discussed herein, e.g., by visualization, navigation, grouping, binding, deployment, execution, modification, display, creation, loading, and/or other operations.

A browser, explorer, manager, application and/or other software 120 utilizes a user interface 122. The software 120 accesses and/or modifies (or otherwise interacts with) a hierarchical structure 124, that is, a data structure organized at least partially in a hierarchy. The hierarchical structure 124 includes nodes 126 which are related to one another in the hierarchy by links 128. In the particular example of file system hierarchy, the nodes may represent directories 130, e.g., files and file folders. The software 120, hierarchical structure 124, and other items shown in the Figures may reside partially or entirely within one or more media 112, thereby configuring those media. An operating environment may also include other hardware, such as a display 132, buses, power supplies, and accelerators, for instance.

A given operating environment 100 may include an Integrated Development Environment (IDE) 134 which provides a developer with a set of coordinated software development tools. In particular, some of the suitable operating environments for some embodiments include or help create a Microsoft® Visual Studio® development environment (marks of Microsoft Corporation) configured to support program development. Some suitable operating environments include Java® environments (mark of Sun Microsystems, Inc.), and some include environments which utilize languages such as C++ or C# ("C-Sharp"), but teachings herein are applicable with a wide variety of programming languages, programming models, and programs, as well as with endeavors outside the field of software development per se that use file systems and/or other hierarchical structures 124.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
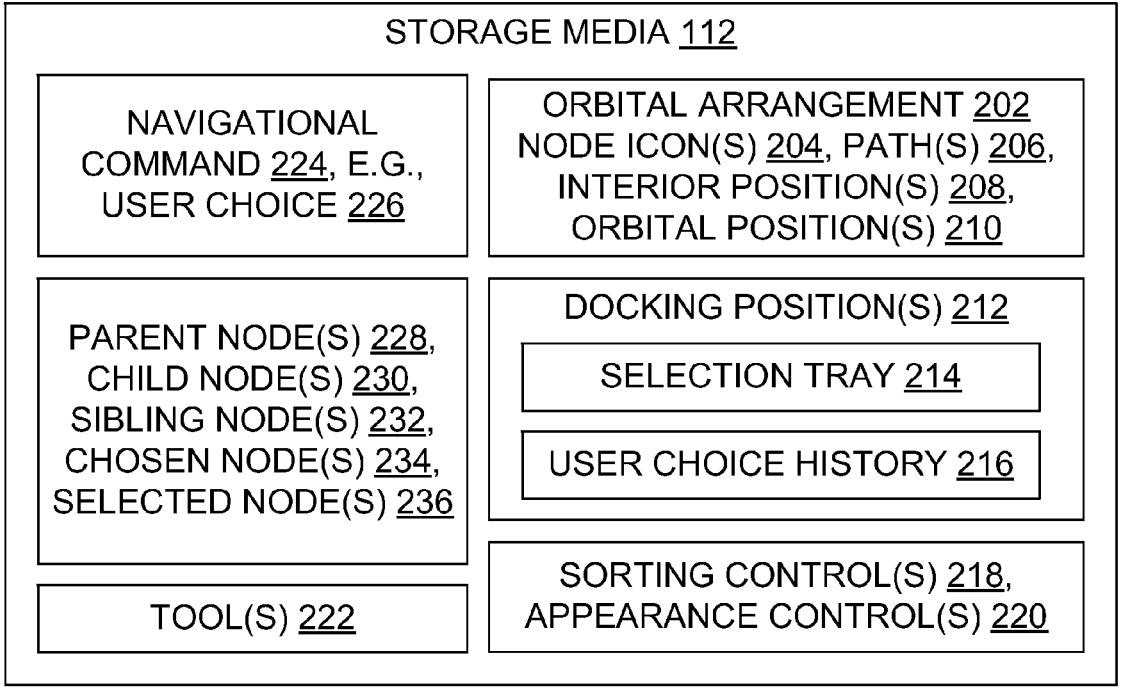
FIG. 2 is a block diagram illustrating aspects of an example architecture for orbital navigation of hierarchical structures.

FIG. 2 illustrates aspects of an architecture which is suitable for use with some embodiments. A display 132 may be configured by an orbital arrangement 202 which has node icons 204 representing nodes 126 of the hierarchical structure(s) 124 of interest. Reference may be made herein to "nodes" in an orbital arrangement as shorthand for "node icons". For instance, "rotating nodes" is a more concise way of saying "rotating node icons".

The screen positions (display 132 locations) of node icons implicitly define an orbital path 206, which may be displayed or not, depending on the embodiment, for example. The orbital path in some embodiments is at least an orbital curve and may be generally circular, as those terms are defined above. Closed orbital curves have interior position(s) 208, namely, positions enclosed by the curve. Orbital paths have orbital position(s) 210, namely, positions occupied by orbiting node icon(s) 204.

A user interface may display an orbital arrangement 202 on a display 132. In addition, some embodiments in user interfaces display or otherwise define docking position(s) 212 which are not on the orbital path and hence supplement the orbital positions. For example, some embodiments allow a user to dock a node icon, or a copy of a node icon, in a selection tray 214 (also referred to as a selection tray area). Similarly, some embodiments automatically dock a node icon, or a copy of a node icon, in a user choice history 216 (also referred to simply as a history 216).

In addition to orbital positions 210, and docking positions 212 in a selection tray and/or a history, some embodiments display controls as part of a user interface. For example, some embodiments provide sorting controls 218 allowing a user to have the system sort nodes according to time, name, and/or other criteria. Some embodiments provide appearance controls 220 allowing a user to change the appearance of the node icons and/or other visual aspects of nodes, such as default thumbnail size, icon image vs. name, and so on.

Some embodiments include tool(s) 222 which receive and respond to navigational commands 224 and related data, such as user choices 226 specifying particular nodes 126. Tools 222 may include graphical components in a user interface 122, other interface components such as Application Program Interfaces, and/or code for translating user actions (e.g., finger swipe, mouse click) into navigation and/or exploration of the hierarchical structure (e.g., rotate files to browse through them, open folder and display its files). Some embodiments include Natural User Interface ("NUI") hardware and/or software. For example, in some embodiments a user may select nodes, choose nodes, open nodes, close nodes, reposition nodes, enter values, and/or otherwise interact with an embodiment using a touch screen, another touch-sensitive device, a spoken command, or another NUI gesture.

A given node 126 may play different roles at different times and/or in different contexts. For example, depending on the location taken as current within a file system hierarchical structure, a given node 126 may be viewed as a parent node 228, as a child node 230, or as a sibling node 232. Moreover, a given node 126 may be a chosen node 234 at one point in time because a user has recently clicked on, touched, or otherwise chosen the node, and also be a non-chosen node at some other time. Likewise, a given node 126 may be a selected node 236 at one time because a user has placed the node in the selection tray 214, and also be a non-selected node at some other time because it is not currently in the selection tray.

With reference to FIGS. 1 and 2, some embodiments provide a computer system 102 with a logical processor 110 and a memory medium 112 configured by circuitry, firmware, and/or software to facilitate navigation of a hierarchical structure 124 as described herein. For example, some embodiments include a logical processor 110, a memory 112 in operable communication with the logical processor, and a hierarchical structure 124 of nodes 126 residing at least partially in the memory. A display 132, which is also in operable communication with the logical processor, is configured by an orbital arrangement 202 of child node icons and a parent node icon. The child node icons 204 represent respective child nodes 230 of a parent node 228; the parent node icon 204 represents the parent node. The child nodes and the parent nodes are part of the hierarchical structure 124.

Figure 16:
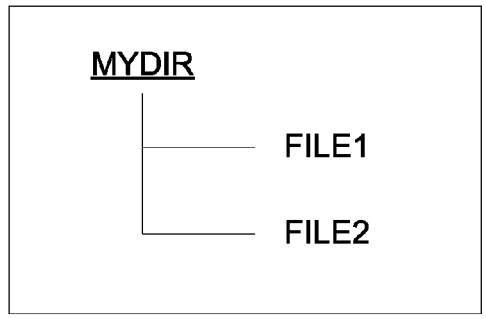
FIG. 16 is a simplified screen image illustrating a tree layout diagram.
Figure 17:
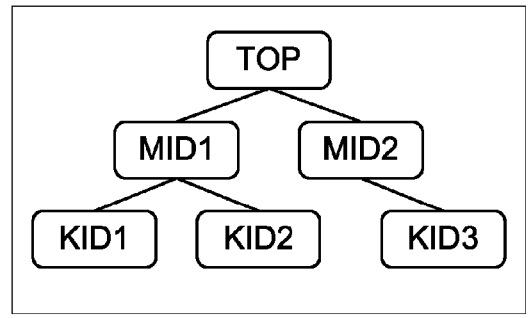
FIG. 17 is a simplified screen image illustrating another tree layout diagram.

In some embodiments, the display 132 is configured to show at most one linear connection (link 128 icon) drawn between the parent node and any of the child nodes. In this respect, at least, such a display in a file manager embodiment differs from another file manager (e.g., FIG. 16 or FIG. 17) in which all parent-child relationships are shown on screen by lines connecting a parent icon image or parent directory name to each child icon image or file name for a file within the directory.

It will be appreciated that an embodiment is not restricted to showing only an orbital arrangement; embodiments may also show other displays. For example, a display overall, or a display in the form of a window which previously showed an orbital arrangement may at other times be predominantly or entirely filled by content of a given opened file, e.g., by a picture or a textual document. Similarly, such a display may at times show file names or other node icons arranged in a grid or list, rather than in a generally circular orbital arrangement.

In some embodiments, the display is free of any linear connection drawn between the parent node and any of the child nodes. In some embodiments, the display not only shows an orbital arrangement 202 but is also free of any radial layout diagram showing the parent node and the child nodes. In some, the display is free of any tree layout diagram showing the parent node and the child nodes.

In contrast with orbital arrangements, radial layout diagrams and tree layout diagrams include lines connecting parent nodes with their respective child nodes. A tree layout diagram often has a root at the top of the screen and successive generations of descendants shown successively further down below the root, so nodes that are separated from the root by fewer generations tend to be higher on the screen. A radial layout diagram often resembles a tree flattened onto a sheet of paper, showing some root node, lines from that root node to its children, lines from each child to its children, and so on. A radial layout diagram has one of the nodes at the center, with lines radiating out to that node's descendants and ancestors. In a radial layout, nodes that are separated from the chosen node by fewer generations tend to be closer to the chosen (central) node on the screen.

In some embodiments, the display is configured with a history 216 showing user-chosen nodes 234 arranged according to when they were chosen. In some, the display is configured with a selection tray 214 showing user-selected nodes, e.g., showing at least three selected nodes 236.

In some embodiments, the display is configured with at least one of the following: a control 218 for sorting nodes according to a chronological parameter (e.g., creation date, modification date), a control 218 for sorting nodes according to a node name parameter (e.g., alphabetic order), a control 218 for sorting nodes according to a size parameter (e.g., file size, number of children), a control 218 for sorting nodes according to a node type parameter (e.g., file type, file owner, file system permissions), a control 220 for altering node icon size (e.g., thumbnail size).

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Processes

Figure 3:
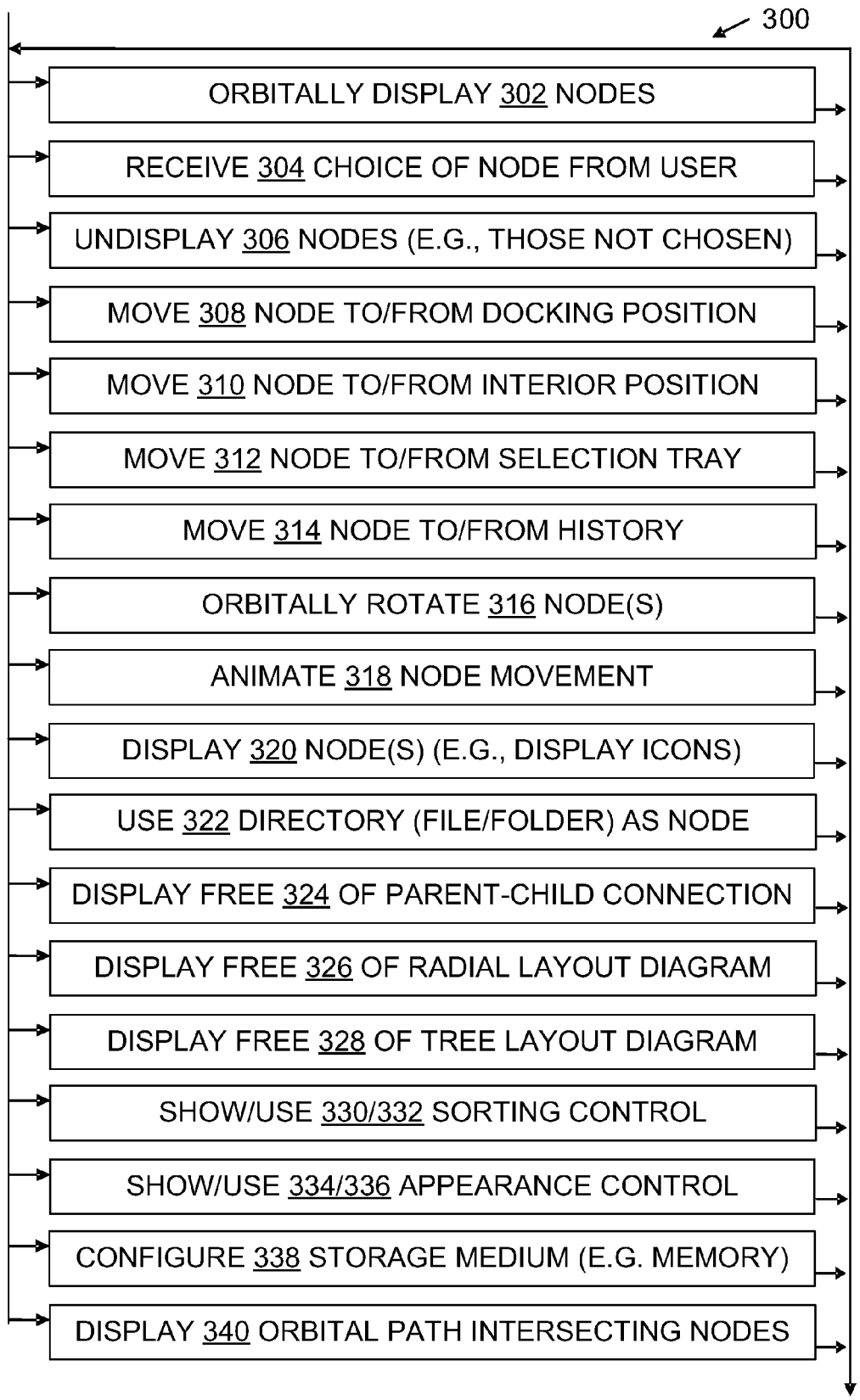
FIG. 3 is a flow chart illustrating steps of some process and configured storage medium embodiments.

FIG. 3 illustrates some process embodiments in a flowchart 300. Processes shown in the Figures may be performed in some embodiments automatically, e.g., by a user interface script or other testbed which simulates or otherwise generates input to an embodiment. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During an orbital displaying step 302, an embodiment displays nodes (e.g., as node icons) in an orbital curve. It will be understood that "orbitally displaying" nodes allows but does not require that the complete orbital curve be visible on screen. Step 302 may be accomplished using graphical user interfaces, file systems, and/or other mechanisms suitably adapted to obtain node information and visualize it as taught herein, for example.

During a choice receiving step 304, an embodiment receives a node choice 226 from a user. Step 304 may be accomplished using a mouse, touch screen, user interface shim, and/or other familiar mechanism for providing input to a user interface which is configured as taught herein.

The terms "choice" and "selection" are not equivalent as used herein; "choice" is a broader term encompassing "selection". A node selection, which moves a node into a selection tray, is one example of a node choice. But nodes may also be chosen for other reasons, such as to open/close a folder, to rotate through a circular list of nodes, to jump to a point in a node history, to display node characteristics (name, size, date, owner, type, etc.), and so on.

Note also that many steps discussed herein, including step 304, may be viewed from a user perspective or from a system perspective. From a user perspective, a user sends a system a node choice; from a system perspective, a system receives a choice indicating a node. Similarly, either a user or a system may be said to move a node, to use a particular kind of node, and so on, depending on the perspective employed.

During an undisplaying step 306, an embodiment undisplays nodes, e.g., nodes which were not chosen in step 304. Undisplayed nodes are generally removed from view; a visible node is a choosable node in most embodiments. Following the practice taken in some familiar file managers or menu systems, however, in some embodiments a node is undisplayed by showing the node icon in grayed-out or outline form rather than normal full form. Step 306 is performed automatically, as a system-perspective step, in response to user input.

During a docking/undocking step 308, an embodiment moves a node to/from a docking position; the move 308 is reflected on the display by movement of the node's icon. For instance, a directory node may be automatically docked in the history as a result of a user opening that directory. A node may be docked in a selection tray as a result of a user double-clicking, double-tapping, dragging, or otherwise using a mechanism to move the node's icon to/from the selection tray area of the display.

During an interior moving step 310, an embodiment moves a node to/from an interior position of an orbital arrangement. For example, in an orbital arrangement which has a generally circular orbital curve, a node may initially appear at an interior position 208 near the center (where the sun would be in a solar system) and then be moved outward to an orbital position 210 on an orbital curve several node diameters away from the initial central interior position. Like other moving steps such as steps 308, 312-316, moving step 310 may be accomplished using familiar graphical user interface mechanisms adapted to provide movements and arrangements as taught herein.

During a selection moving step 312, an embodiment moves a node to/from a selection tray 214, updating the node's icon in the display and an internal selection tray data structure (e.g., a list of pointers to selected nodes 236) accordingly.

During a history moving step 314, an embodiment moves a node to/from a history 216, updating the node's icon in the display and an internal history data structure (e.g., a list of pointers to chosen nodes 234) accordingly.

During a node rotating step 316, an embodiment rotates nodes by moving their icons along an orbital curve, e.g., to see node names which are hidden behind other node icons.

During an animating step 318, an embodiment animates movement of one or more nodes. That is, rather than merely showing a node's icon at a beginning position and an ending position to indicate node movement, the embodiment also shows the node at a sequence of intermediate positions along some trajectory between the beginning position and the ending position. Step 318 may be part of any of steps 308-316, for example. Step 318 may be accomplished using familiar graphical user interface and animation mechanisms, adapted to support orbital navigation through a hierarchical structure as taught herein.

During a node displaying step 320, an embodiment displays nodes 126 by displaying node icons 204 and/or other node information such as node type, node owner, node size, and so on. Step 320 may be accomplished using familiar graphical user interface mechanisms, adapted to support orbital navigation through a hierarchical structure as taught herein.

During a directory using step 322, an embodiment (from the system perspective) or a user (from the user perspective) uses a particular kind of node, namely, a directory. Although the term "directory" is sometime used elsewhere to mean a folder or other container, herein "directory" is used more inclusively, to mean a folder or a file.

During a parent-child-connection-free displaying step 324, an embodiment displays an arrangement of nodes without displaying lines or other explicit indicators connecting child node(s) with their respective parent node(s). Displaying step 324 occurs in displaying FIGS. 4-11. By contrast, a display like the one shown in FIG. 16 would not occur as part of step 324, because connections are displayed there between parent node MYDIR and its child nodes FILE1, FILE2. Similarly, a display resembling the one shown in FIG. 17 would not occur as part of step 324, because connections are displayed between parent node TOP and its child nodes MID1, MID2, and also displayed between parent nodes MID1, MID2 and their child node(s)

During a radial-layout-free displaying step 326, an embodiment displays 302 an orbital arrangement of nodes without displaying a radial layout diagram.

During a tree-layout-free displaying step 328, an embodiment displays 302 an orbital arrangement of nodes without displaying a tree layout diagram.

During a sorting control showing step 330, an embodiment shows a sorting control 218 on a display, e.g., by using familiar graphical user interface mechanisms consistent with the teachings herein.

During a sorting control using step 332, a user uses a sorting control 218, e.g., to cause an embodiment to sort explicitly chosen nodes 234, or to sort implicitly chosen (currently displayed) child nodes 230.

During an appearance control showing step 334, an embodiment shows an appearance control 220 on a display, e.g., by using familiar graphical user interface mechanisms consistent with the teachings herein.

During an appearance control using step 336, a user uses an appearance control 220, e.g., to cause an embodiment to change thumbnail node icon size for explicitly chosen nodes 234, or for implicitly chosen (currently displayed) nodes.

During a memory configuring step 338, a memory medium 112 is configured by an orbital arrangement 202, by an orbital navigation tool 222, or otherwise in connection with orbital navigation and/or exploration of hierarchical structures as discussed herein.

During an explicit path displaying step 340, an embodiment draws a circle, ellipse, or other orbital curve on screen, or an arcuate portion thereof, explicitly intersecting node icons which are also shown on screen.

The foregoing steps and their interrelationships are discussed in greater detail below, in connection with various embodiments.

Some embodiments provide a process for navigating nodes within a hierarchical structure. The process utilizes a device which has at least one logical processor 110 in operable communication with at least one memory 112. The process includes orbitally displaying 302 multiple sibling nodes 232, and receiving 304 a choice 226 of one of the orbitally displayed sibling nodes. In response to the choice, the process undisplays 306 the sibling nodes which were not chosen, and orbitally displays 302 multiple child nodes 230 of the chosen sibling node. It will be understood that the hierarchical structure 124 containing the various nodes contains, at least at the location of interest, multiple sibling nodes and multiple child nodes as indicated. It will also be understood that the presence of multiple nodes is merely illustrative, in that similar processes can be used to orbitally navigate other portions of the hierarchical structure, and other hierarchical structures, which happen to have solitary sibling/child nodes.

In some embodiments, the process includes animating 318 movement of the chosen sibling node into a docking position 212. The chosen node could be docked in the history, in the selection tray, or in both.

In some embodiments, the process includes orbitally rotating 316 at least one of the nodes in response to a navigational command 224 from a user.

In some embodiments, the process includes displaying 320 the chosen sibling node adjacent (e.g., in the same window or on the same page) an orbital arrangement of child nodes of the chosen sibling node. For example, the chosen node may be displayed in a history or in a selection tray.

In some embodiments, the process includes further navigation. For example, in response to a choice of one of the displayed child nodes, a process may undisplay 306 the child nodes which were not chosen, and orbitally display multiple descendant nodes of the chosen child node. In effect, the user has thus navigated one level deeper in the hierarchical structure. As another example, in response to a choice of a parent node of the displayed child nodes, a process may undisplay 306 the child nodes and also orbitally display 302 the parent node and any sibling(s) of the parent node. In this case, the user has navigated back up one level in the hierarchy.

Figure 18:
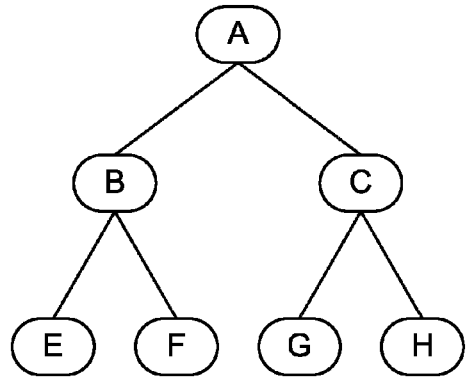
FIG. 18 is a diagram illustrating a hierarchical structure, including nodes which are cousins of one another rather than siblings.

In some embodiments, the process displays 320 multiple selected nodes 236 in a selection tray area. In some cases, at least two of the selected nodes are non-siblings of one another. That is, in some embodiments nodes in the selection tray do not have to be siblings. For instance, in the hierarchy shown in FIG. 18, one could create a selection tray holding only nodes E and H. This feature does not necessarily rule out putting siblings in a selection tray. Rather, in some embodiments a user is not limited to selecting siblings for the selection tray.

In some embodiments, the process displays 320 a history 216 showing nodes arranged according to when they were chosen. For instance, one embodiment displays at least three user-chosen nodes. In a given embodiment, nodes can be displayed 320 by being shown on screen, either with overlapping icons or with icons that do not overlap.

Some embodiments are directed specifically at file systems and other hierarchical structures that include directories 130. For example, some embodiments provide a process for navigating directories within a hierarchical structure, including displaying 302 multiple sibling directories in a first orbital arrangement 202, and receiving 304 a choice of one of the displayed sibling directories. In response to the choice, the process displays 320 the chosen sibling directory at a position outside the first orbital arrangement (e.g., a docking position 212), and displays 302 multiple child directories of the chosen sibling directory in a second orbital arrangement 202.

In some embodiments, no orbital path is expressly drawn in the orbital arrangement(s) 202; the path 206 is merely implied by movement of the nodes. In other embodiments, the process explicitly displays 340 an orbital path intersecting the directories in the second orbital arrangement. For example, FIGS. 4-7 and 9-12 each show at least one displayed 340 path. FIG. 10 shows three displayed 340 paths 206, and FIG. 12 shows five displayed 340 paths 206. FIG. 8, however, does not show any displayed path.

In some embodiments, the process animates 318 a movement of at least one of the child directories into the second orbital arrangement. For instance, in one embodiment an orbital arrangement rotates and expands as a chosen node moves into a history and the non-chosen siblings are undisplayed. As another example, some processes animate 318 movement of the child directories from an interior position 208 of the second orbital arrangement into respective orbital positions of the second orbital arrangement, thereby showing subfolders in motion from the center as they are revealed when their parent is opened.

Some embodiments orbitally rotate 316 directories in response to a navigational command from a user; animation may be used during the rotation. In other embodiments, different animation or no animation is used. For example, some embodiments simply redraw the display with directories in their new positions after a user choice.

As to additional navigation, in some embodiments the process includes undisplaying the child directories which were not chosen, and orbitally displaying at least one descendant directory of the chosen child directory, in response to a user choice of one of the displayed child directories. In some, the process includes undisplaying the child directories and also orbitally displaying the parent directory and any sibling(s) of the parent directory, in response to a user choice of a parent directory of the displayed child directories.

Configured Media

Some embodiments include a configured computer-readable storage medium 112. Medium 112 may include disks (magnetic, optical, or otherwise), RAM, EEPROMS or other ROMs, and/or other configurable memory, including in particular non-transitory computer-readable media (as opposed to wires and other propagated signal media). The storage medium which is configured may be in particular a removable storage medium 114 such as a CD, DVD, or flash memory. A general-purpose memory, which may be removable or not, and may be volatile or not, can be configured into an embodiment using items such as orbital arrangements 202 and orbital navigation tools 222 (which perform processes described herein), in the form of data 118 and instructions 116, read from a removable medium 114 and/or another source such as a network connection, to form a configured medium. The configured medium 112 is capable of causing a computer system to perform process steps for transforming data through orbital navigation of hierarchies as disclosed herein. FIGS. 1 through 3 thus help illustrate configured storage media embodiments and process embodiments, as well as system and process embodiments. In particular, any of the process steps illustrated in FIG. 3, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

Figure 4:
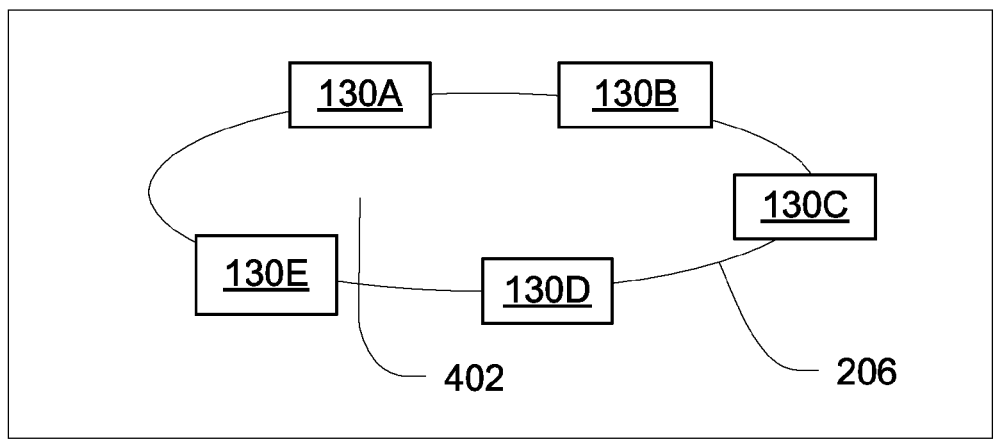
FIG. 4 is a simplified screen image showing directories listed in a circular view, as an example of an orbital arrangement for hierarchical structure navigation.

FIG. 4 shows a screen shot which has been simplified to a diagram with attention focused on orbital navigation features. An orbital arrangement 202 includes directories 130 located in orbital positions along an orbital path around an interior 402. The directories are listed, but are in a circular view rather than a textual recitation.

In the illustrated arrangement, the directory icons do not overlap and they are substantially evenly spaced around the orbit. However, in alternative arrangements node icons 204 may be unevenly spaced. For instance, nodes may be overlapping each other at the back of the orbit (away from the user) and spaced apart from each other at the front of the orbit, for macro browsing at the back and micro browsing at the front. Similarly, node icons in a given orbit may move at different speeds relative to one another.

Figure 5:
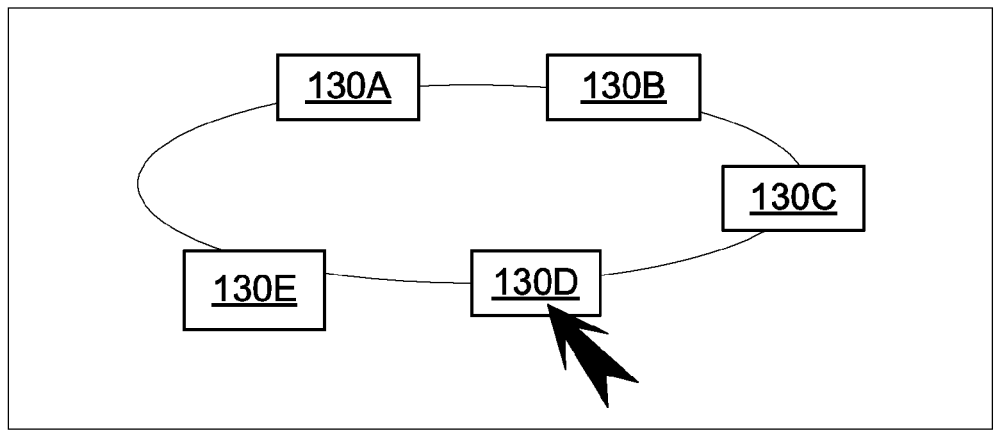
FIG. 5 is a simplified screen image illustrating user choice of a directory in the FIG. 4 example.

FIG. 5 shows a user choosing one of the FIG. 4 directories. In this example, an arrow cursor controlled with a mouse or trackball is used to indicate the chosen node; in alternative embodiments using a pen or touch screen, cursors are not necessarily used. Also, in this illustration, nodes are named using part numbers, but it will be appreciated that in an embodiment node names are not necessarily displayed as part of node icons; thumbnails of content could be displayed instead, for example. Also, node names used in other embodiments need not follow the node naming conventions used in the Figures.

Figure 6:
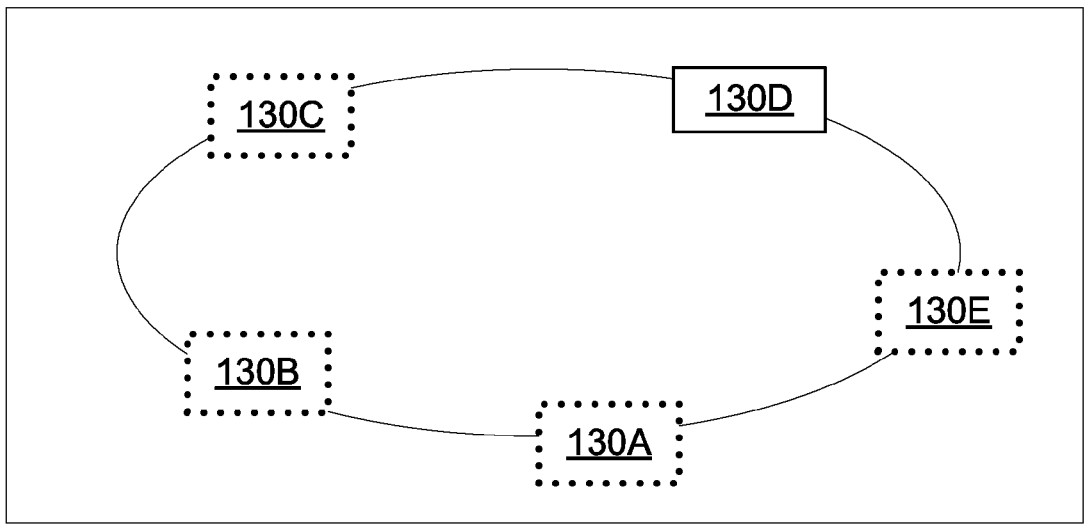
FIG. 6 is a simplified screen image illustrating a result of the directory choice shown in FIG. 5.

FIG. 6 shows an intermediate result of the FIG. 5 choice, a snapshot from within an animation. The chosen directory 130D is rotating into position to dock in a history in the top left corner of the display (the history is shown in later Figures). Meanwhile, the circle (ellipse, etc.) of sibling directories rotates and expands, and non-chosen directories disappear.

Figure 7:
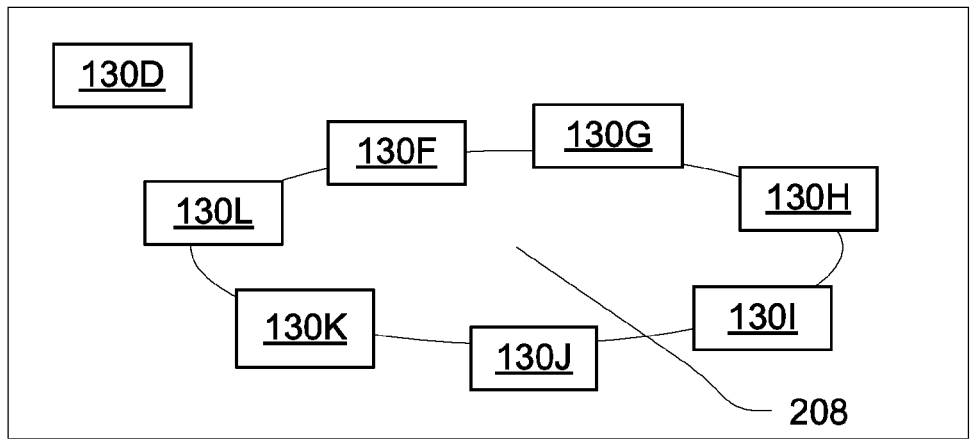
FIG. 7 is a simplified screen image further illustrating results of the directory choice shown in FIG. 5.
Figure 8:
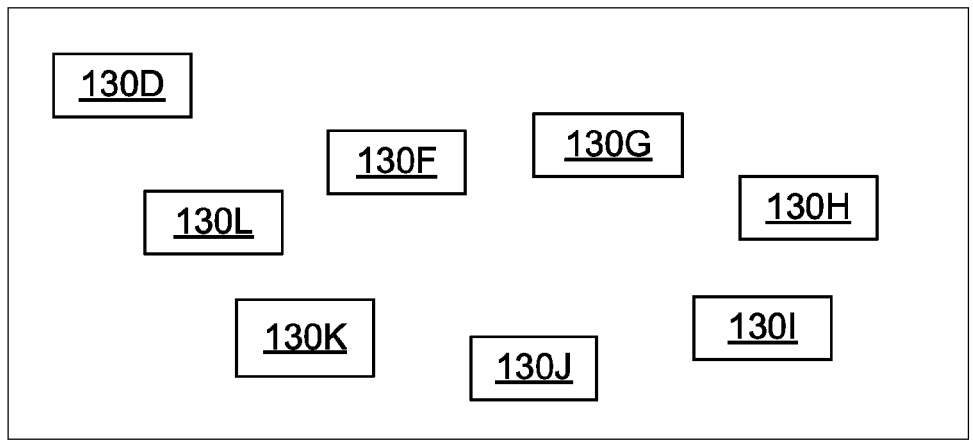
FIG. 8 is a simplified screen image showing an alternative to the embodiment shown in FIG. 7, in that an orbital path is shown between nodes in FIG. 7 and is not explicitly displayed in FIG. 8.

FIG. 7 shows chosen directory 130D docked in a history. Chosen directory 130D has been opened, and the child directories of chosen directory 130D are shown in their orbital positions. In one embodiment, the children of an opened directory come into view near (e.g., within two icon 204 diameters) the center position 208 of their eventual orbital arrangement and then move outward to their orbital positions 210.

FIG. 8 shows an alternative embodiment of the FIG. 7 orbital arrangement, in which the orbital path 206 is not explicitly drawn.

Figure 9:
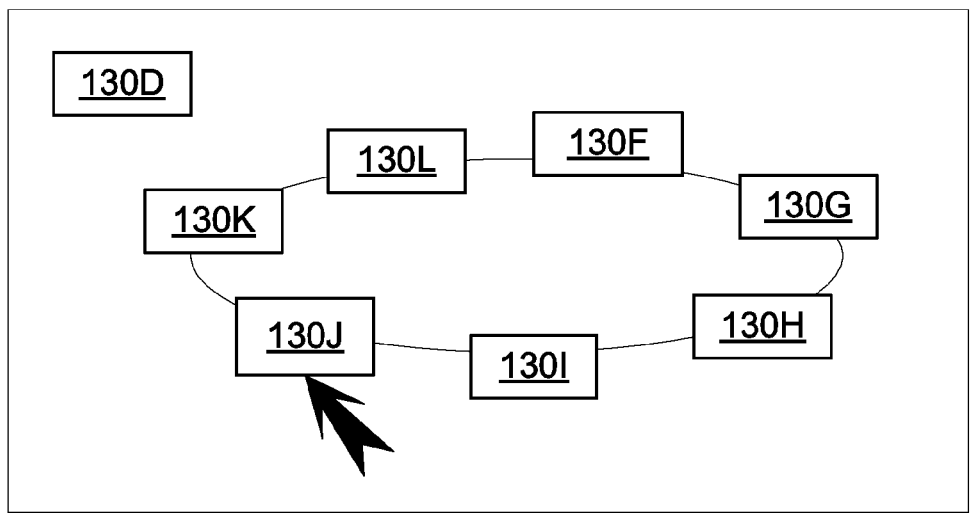
FIG. 9 is a simplified screen image illustrating rotation of directories shown in FIG. 7, and choice of a directory.
Figure 10:
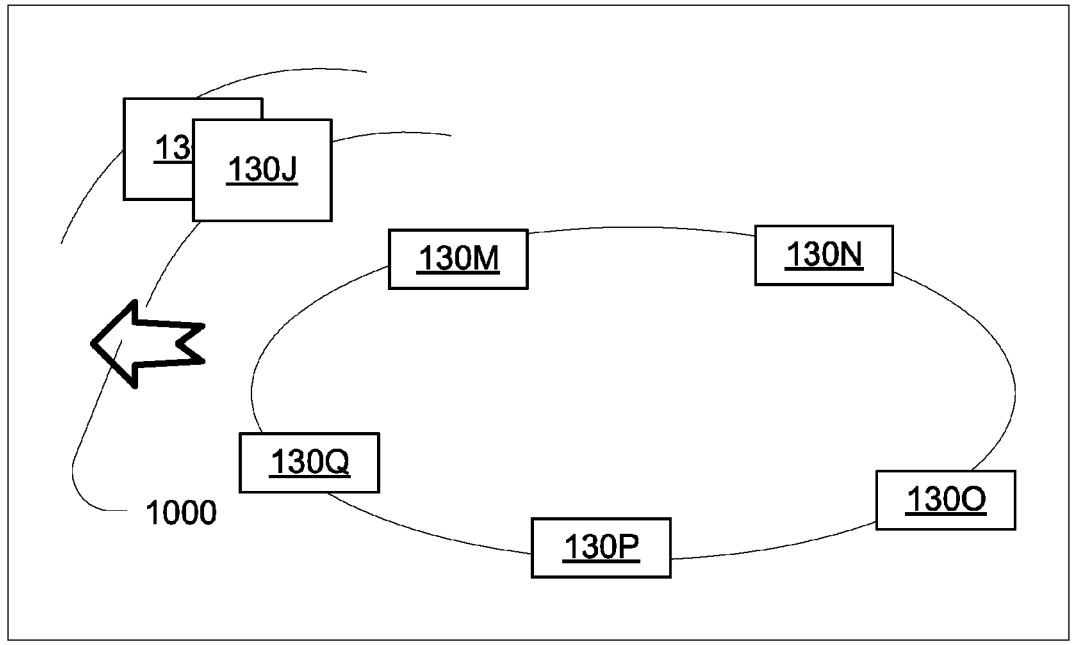
FIG. 10 is a simplified screen image illustrating results of the directory choice shown in FIG. 9, and showing in particular a history update.

FIG. 9 shows an additional navigation from the situation in FIG. 7. The children of directory node 130D have been rotated 316, and one of them is being chosen at step 304 by a user.

FIG. 10 shows a result of the FIG. 9 navigation. The chosen directory 130J is docked in the history, in front of previously chosen directory 130D. Each history node is intersected by an arcuate portion of an orbital curve. The children of most recently chosen directory 130J are displayed in an orbital arrangement. A history back arrow 1000 allows a user to reverse the navigation, by closing directory 130J.

Figure 11:
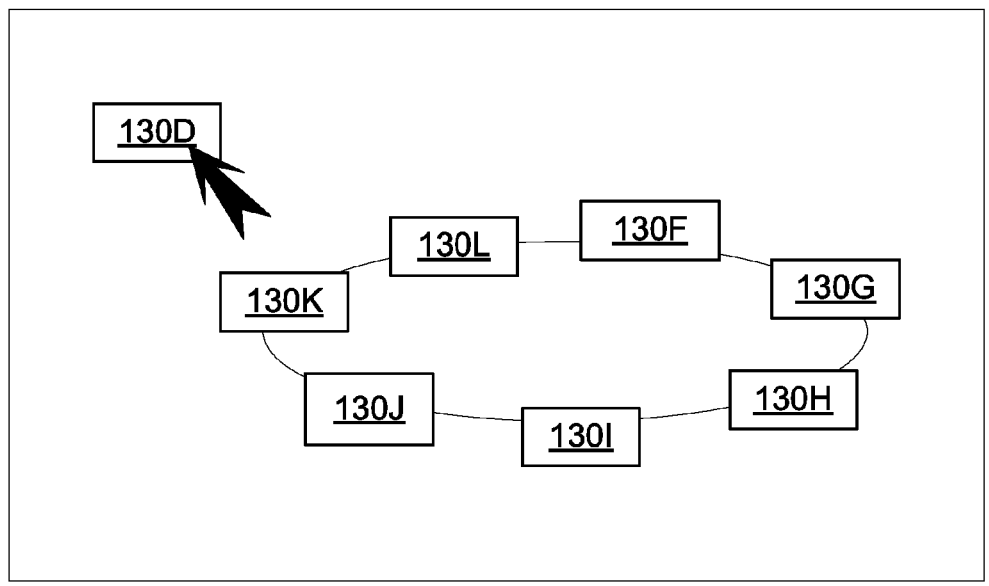
FIG. 11 is a simplified screen image illustrating choice of another directory in the FIG. 9 example.
Figure 12:
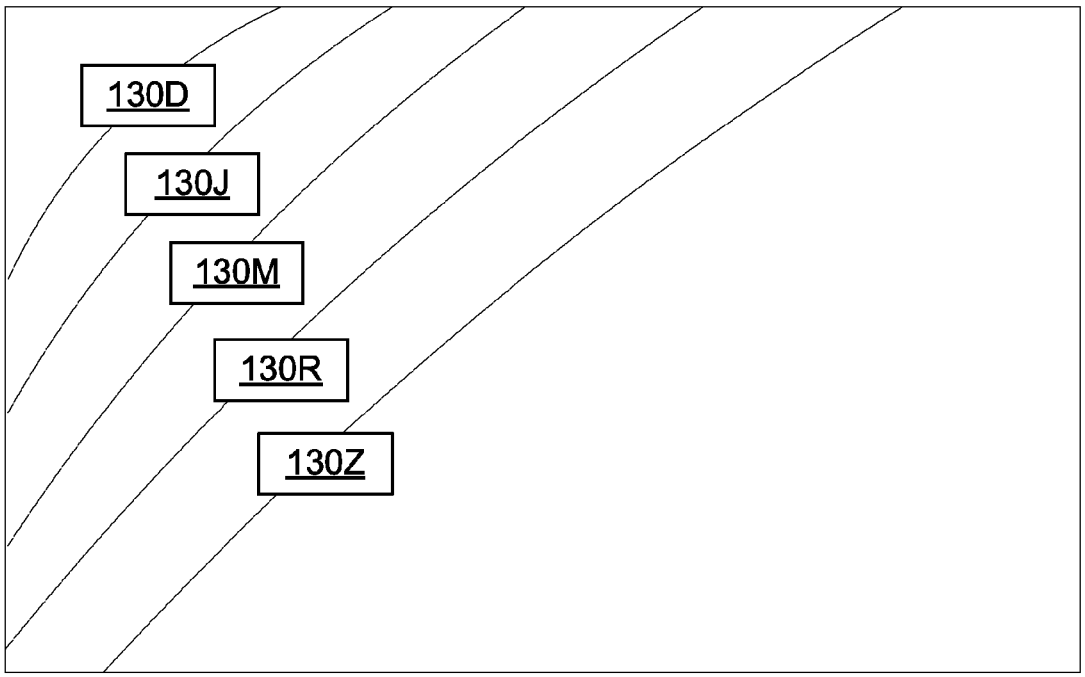
FIG. 12 is a simplified screen image further illustrating a history.

FIG. 11 shows an alternate to FIG. 9, in which the parent directory 130D is being chosen. In some embodiments, choosing an icon of a higher level directory will cause its orbit to shrink and move into the center of attention. An outer orbit, such as one intersecting a node in the history, can thus become an inner orbit. In some embodiments, the previous inner orbit then disappears. For instance, orbiting nodes can move back into the center position 208 and disappear.

FIG. 12 is a simplified screen image further illustrating a history. Nodes are depicted in orbits, with the most recently opened node (directory 130Z) shown in the innermost/smallest/apparently closest orbit. In some embodiments, the history nodes are shown in such non-overlapping locations by default, while in other embodiments, clicking on a history control toggles between this expanded view of the history and a more compact view (less screen area) in which node icons of history nodes are overlapping and/or smaller.

Figure 13:
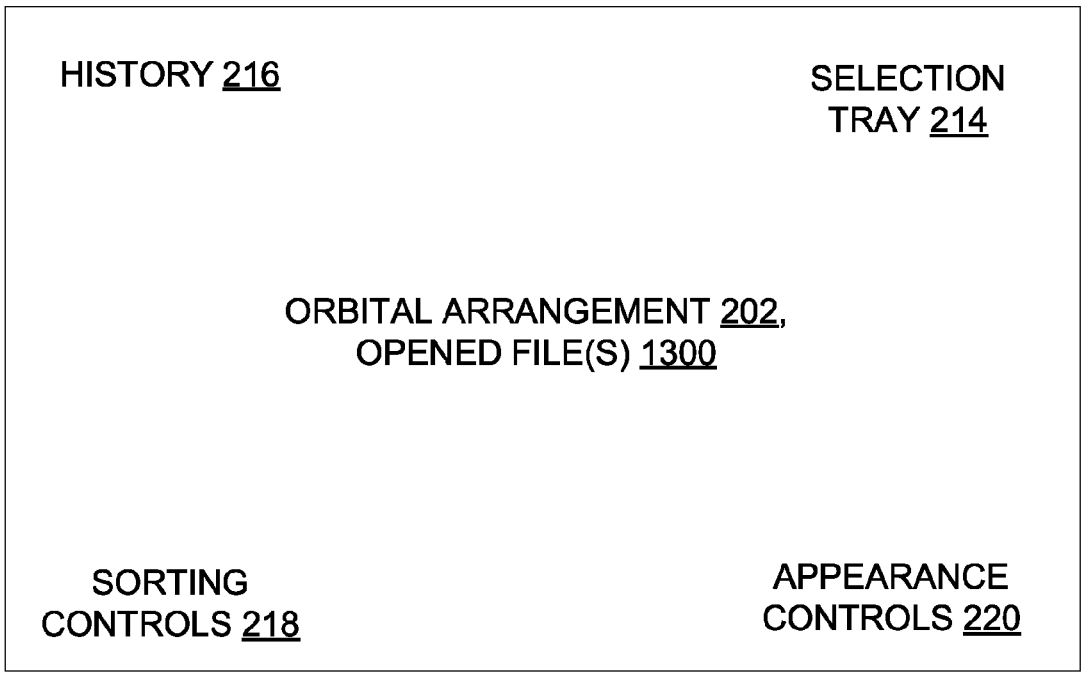
FIG. 13 is a screen layout diagram illustrating primary functionalities of several screen areas in a sample embodiment.

FIG. 13 is a screen layout diagram illustrating primary functionalities of several screen areas in a sample embodiment. Other layouts can be used in other embodiments, and different or additional features may be shown on screen. In addition to aspects of the sample layout already discussed above, in some embodiments opened files 1300 are superimposed on an orbital arrangement 202. In some embodiments, choosing a selection tray icon will open a grid or other depiction of nodes currently in the selection tray 214.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 3 through 13 also help describe configured media, and help describe the operation of systems and manufactures like those discussed in connection with FIGS. 1 and 2. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A process for navigating nodes within a hierarchical structure, the process utilizing a device which has at least one logical processor in operable communication with at least one memory, the process comprising the steps of:
   orbitally displaying multiple sibling nodes at a first level within a hierarchical structure of orbital displays of nodes;
   receiving a choice of one of the orbitally displayed sibling nodes at the first level;
   in response to the choice, performing a navigation from the first level to a second level within the hierarchical structure of orbital displays of nodes, undisplaying the sibling nodes at the first level which were not chosen, and orbitally displaying at the second level multiple child nodes of the chosen sibling node;
   displaying a copy of at least one selected node in a selection tray that is distinct from a node choice history area in that the selection tray contains a copy of a node which was not chosen as part of changing levels in the hierarchical structure of orbital displays of nodes but was instead selected to perform an operation other than navigation from an orbital display at one level to an orbital display at another level of the hierarchical structure; and
   animating movement of the chosen sibling node into a docking position.

2. The process of claim 1, further comprising orbitally rotating at least one of the nodes in response to a navigational command from a user.

3. The process of claim 1, further comprising displaying the chosen sibling node adjacent an orbital arrangement of child nodes of the chosen sibling node.

4. The process of claim 1, further comprising at least one of the following:
   in response to a choice of one of the displayed child nodes, undisplaying the child nodes which were not chosen, and orbitally displaying multiple descendant nodes of the chosen child node;
   in response to a choice of a parent node of the displayed child nodes, undisplaying the child nodes and also orbitally displaying the parent node and any sibling(s) of the parent node.

5. The process of claim 1, further comprising displaying a history showing at least three user-chosen nodes arranged according to when they were chosen.

6. The process of claim 1, wherein the step of orbitally displaying multiple sibling nodes leaves the display free of any orbital path between the sibling nodes.

7. A computer-readable storage device configured with data and with instructions that when executed by at least one processor causes the processor(s) to perform a process for navigating directories within a hierarchical structure, the process comprising the steps of:
   displaying multiple sibling directories in a first orbital arrangement at a first level within a hierarchical structure of orbital displays of directories;
   receiving a choice of one of the displayed sibling directories at the first level;
   in response to the choice, displaying the chosen sibling directory at a position outside the first orbital arrangement, and displaying multiple child directories of the chosen sibling directory in a second orbital arrangement at a second level within the hierarchical structure of orbital displays of directories;
   displaying multiple selected directories in a selection tray area that is distinct from a directory choice history area, at least two of the selected directories being non-siblings of one another, the selection tray distinct from a directory choice history area in that the selection tray contains a copy of a directory icon which was not chosen as part of changing levels in the hierarchical structure of orbital displays of directories but was instead selected to perform an operation other than navigation to an orbital display at another level of the hierarchical structure; and
   animating a movement of at least one of the child directories into the second orbital arrangement.

8. The configured computer-readable storage device of claim 7, wherein the process further comprises displaying an orbital path intersecting the directories in the second orbital arrangement.

9. The configured computer-readable storage device of claim 7, wherein the process further comprises animating movement of the child directories from an interior position of the second orbital arrangement into respective orbital positions of the second orbital arrangement.

10. The configured computer-readable storage device of claim 7, wherein the process further comprises orbitally rotating directories in response to a navigational command from a user.

11. The configured computer-readable storage device of claim 7, wherein the process further comprises at least one of the following:
   in response to a user choice of one of the displayed child directories, undisplaying the child directories which were not chosen, by removing them from view, and orbitally displaying at least one descendant directory of the chosen child directory;
   in response to a user choice of a parent directory of the displayed child directories, undisplaying the child directories by removing them from view and also orbitally displaying the parent directory and any sibling(s) of the parent directory.

12. A computer system comprising:
   a logical processor;
   a memory in operable communication with the logical processor;
   a hierarchical structure of nodes residing at least partially in the memory;
   a display also in operable communication with the logical processor, the display configured by an orbital arrangement of child node icons and a parent node icon, the child node icons representing respective child nodes of a parent node, the parent node icon representing the parent node, the child nodes and the parent nodes being part of the hierarchical structure of nodes, and the display showing at most one linear connection drawn between the parent node and any of the child nodes;
   wherein the display is further configured with at least one of the following:
   a control for sorting nodes according to a chronological parameter;
   a control for sorting nodes according to a node name parameter;

a control for sorting nodes according to a size parameter;
a control for sorting nodes according to a node type parameter;
a control for altering node icon size; and
wherein the display is configured with the orbital arrangement of node icons, with at least one of the controls for sorting nodes, and with a selection tray area showing at least one selected node icon.

13. The system of claim 12, wherein the display is free of any linear connection drawn between the parent node and any of the child nodes.

14. The system of claim 12, wherein the display is free of any radial layout diagram showing the parent node and the child nodes.

15. The system of claim 12, wherein the display is free of any tree layout diagram showing the parent node and the child nodes.

16. The system of claim 12, wherein the display is further configured with a history showing user-chosen nodes arranged according to when they were chosen.

17. The system of claim 12, wherein the display is further configured with a selection tray showing at least three user-selected nodes.

18. The system of claim 12, further comprising instructions configuring the memory which upon execution with the logical processor orbitally rotates at least one of the nodes in response to a navigational command from a user.

19. The system of claim 12, further comprising instructions configuring the memory which upon execution with the logical processor configures the display with a history showing at least three user-chosen nodes arranged according to when they were chosen.

20. The system of claim 12, further comprising instructions configuring the memory which upon execution with the logical processor subjects selected nodes to a batch operation specified by a user.

* * * * *